United States Patent

Baumgarten

[11] Patent Number: 5,947,696
[45] Date of Patent: Sep. 7, 1999

[54] WHEEL MOUNTED TIRE PUMP WITH A RECIPROCATING PISTON

[75] Inventor: John M. Baumgarten, Novi, Mich.

[73] Assignee: Hayes Lemmerz International, Inc., Romulus, Mich.

[21] Appl. No.: 08/904,135

[22] Filed: Jul. 31, 1997

Related U.S. Application Data

[60] Provisional application No. 60/023,332, Jul. 31, 1996.

[51] Int. Cl.⁶ .................................................. F04B 35/06
[52] U.S. Cl. .......................................... 417/233; 152/418
[58] Field of Search ..................... 417/233, 470; 152/418

[56] References Cited

U.S. PATENT DOCUMENTS

| | | | |
|---|---|---|---|
| 1,127,079 | 2/1915 | Nielsen | 152/418 |
| 1,288,826 | 12/1918 | Cahill | 152/11 |
| 1,643,945 | 10/1927 | Crook . | |
| 1,679,505 | 8/1928 | Stewart . | |
| 1,887,715 | 11/1932 | Hester . | |
| 1,930,041 | 10/1933 | Crowley et al. | 152/11 |
| 2,055,983 | 9/1936 | Peo | 230/25 |
| 2,161,384 | 6/1939 | Rinfret | 152/418 |
| 2,415,618 | 2/1947 | West | 230/172 |
| 3,327,755 | 6/1967 | Parr | 152/419 |
| 3,927,708 | 12/1975 | Hulme | 152/418 |
| 4,349,064 | 9/1982 | Booth | 152/418 |
| 4,570,691 | 2/1986 | Martus | 152/332.1 |
| 4,651,792 | 3/1987 | Taylor | 152/415 |
| 5,052,456 | 10/1991 | Dosjoub | 152/415 |
| 5,201,968 | 4/1993 | Renier | 152/418 |
| 5,342,177 | 8/1994 | Cheng | 417/233 |
| 5,409,049 | 4/1995 | Renier | 152/418 |
| 5,591,281 | 1/1997 | Loewe | 152/418 |
| 5,667,606 | 9/1997 | Renier | 152/421 |

FOREIGN PATENT DOCUMENTS

| | | |
|---|---|---|
| 906319 | 12/1945 | France . |
| 429262 | 5/1935 | United Kingdom . |
| 467096 | 6/1937 | United Kingdom . |

*Primary Examiner*—Charles G. Freay
*Assistant Examiner*—Robert Z. Evora
*Attorney, Agent, or Firm*—MacMillian, Sobanski & Todd, LLC

[57] ABSTRACT

A tire pump mounted upon a wheel includes a reciprocating piston driven by one of a pendulum assembly or flywheel.

15 Claims, 3 Drawing Sheets

WHEEL MOUNTED TIRE PUMP WITH A RECIPROCATING PISTON

CROSS REFERENCE TO RELATED APPLICATIONS

This application claims the benefit of U.S. provisional application Ser. No. 60/023,332, filed Jul. 31, 1996.

BACKGROUND OF THE INVENTION

This invention relates in general to pneumatic tire pumps and in particular to a tire pump which can be mounted upon a vehicle wheel and driven by rotation of the wheel to supply air to a pneumatic tire.

Pneumatic tires are mounted upon vehicle wheels and form a portion of the vehicle suspension. The flexibility of the tire absorbs minor irregularities in the road surface while maintaining contact with the road surface. The contact area between the tire and the road surface is typically called the tire "footprint". Tire manufacturers have been known to cooperate with vehicle manufacturers to design unique tires for specific vehicles.

All pneumatic tires have a rated inflation pressure. Either overinflation or underinflation of a tire results in a reduced tire footprint. The reduced footprint results in additional wear of portions of the tire and reduces the service life of the tire. Additionally, low tire pressure increases the rolling resistance of the tire, causing an increase in fuel consumption. If the vehicle tires are inflated at different pressures, as would occur if one of the tires is soft, the handling of the vehicle is adversely affected. Accordingly, it desirable to maintain the correct inflation pressure in the vehicle tires.

SUMMARY OF THE INVENTION

This invention relates to a tire pump which can be mounted upon a vehicle wheel and driven by rotation of the wheel to supply air to a pneumatic tire.

Pneumatic tires can be subject to slow leaks of inflation air, such as can occur past the bead of the tire where it contacts the wheel rim. Before the general introduction of radial tires, a vehicle operator could detect a soft bias ply tire by examination. Radial tires have very flexible sidewalls and always look soft, compared to bias ply tires. Thus, a radial tire whose pressure is low is very difficult to detect except by checking the inflation pressure with a pressure gage. Typically, vehicle operators do not check tire pressure until the tires are obviously quite soft. Thus, by the time that the vehicle operator checks the inflation pressure, the tire usually has had its service life reduced by several hundred miles. Additionally, the soft tire affects cornering and traction and can degrade the safe operation of the vehicle. Accordingly, it would be desirable to provide a tire pump which would continuously maintain the correct inflation pressure in each of the vehicle tires.

The present invention contemplates a tire pump including a housing which can be mounted upon a vehicle wheel. The housing has a base portion which defines a chamber and a cylinder portion which defines a cylinder bore. The cylinder bore communicates with the base portion chamber. A reciprocable piston is received within the cylinder bore. A rotatable drive shaft is mounted in the housing base portion and extends into the base portion chamber. A coupling mechanism connects the drive shaft to the piston and is operable to convert the rotary motion of the drive shaft into the reciprocating motion of the piston. A drive mechanism is attached to the drive shaft and is operable to rotate the drive shaft.

Additionally, the housing is mounted upon a bracket which is adapted to be attached to a vehicle wheel such that the cylinder bore extends in a radial direction relative to the center of the wheel.

The coupling mechanism can include a drive wheel mounted upon an end of the drive shaft. The drive wheel carries an eccentrically mounted connecting pin which is coupled to a first end of a connecting rod. The connecting rod has a second end which is connected to the piston. The eccentrically mounted connecting pin is operative to convert rotation of the drive wheel into a reciprocating motion. Alternately, the coupling mechanism can include a cam mounted upon the end of the drive shaft. The cam includes an eccentric lobe which extends into sliding contact with an end of the piston. The cam is operative to convert rotation of the drive shaft into a reciprocating motion of the piston. For the alternate coupling mechanism, a spring is mounted within the housing to urge the piston against the cam lobe.

The drive mechanism can include a pendulum assembly mounted upon the drive shaft. The pendulum mechanism includes a pendulum weight having sufficient weight to remain relatively stationary as the vehicle wheel and pump housing rotate and thereby cause the drive shaft to be rotated relative to the housing. Alternately, a flywheel can be attached to the end of the drive shaft. The flywheel would have sufficient weight to cause rotation of said drive shaft relative to the housing when the vehicle accelerates and decelerates.

The invention further contemplates that the cylinder portion of the housing has an exhaust passageway communicating between the cylinder bore and an exhaust port. The exhaust port is adapted to be connected to an air chamber of a pneumatic tire mounted upon the vehicle wheel. An air regulating device, such as a check valve, is mounted in the exhaust passageway to control the flow of air therethrough.

The cylinder portion of the housing also has a pressure relief passageway communicating between the cylinder bore and a pressure relief port. A normally closed pressure relief valve is mounted within the pressure relief passage way. The pressure relief valve is operable to open when the pressure with the cylinder bore exceeds a predetermined value.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
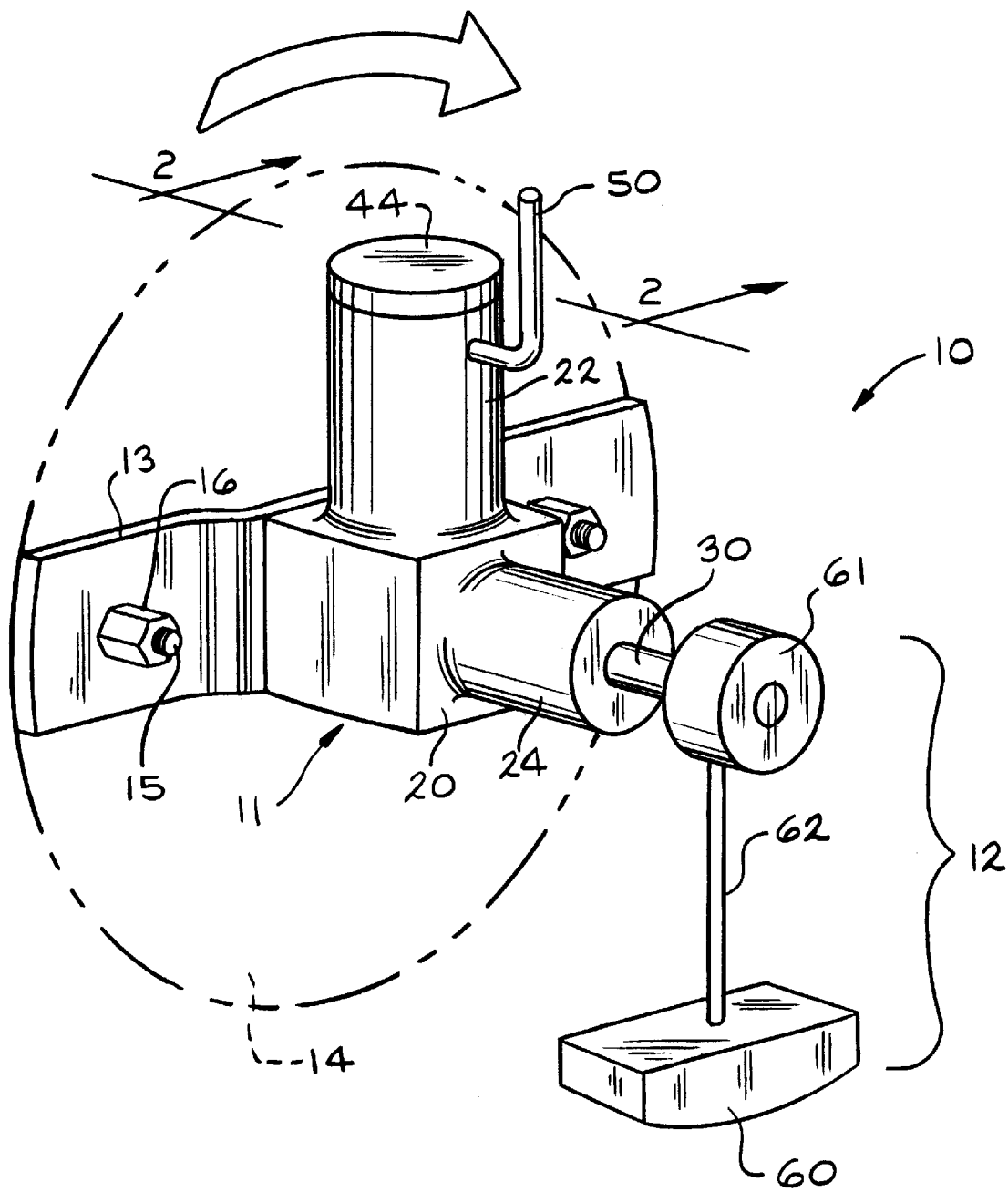
FIG. 1 is a perspective drawing of a tire pump in accordance with the invention.
Figure 2:
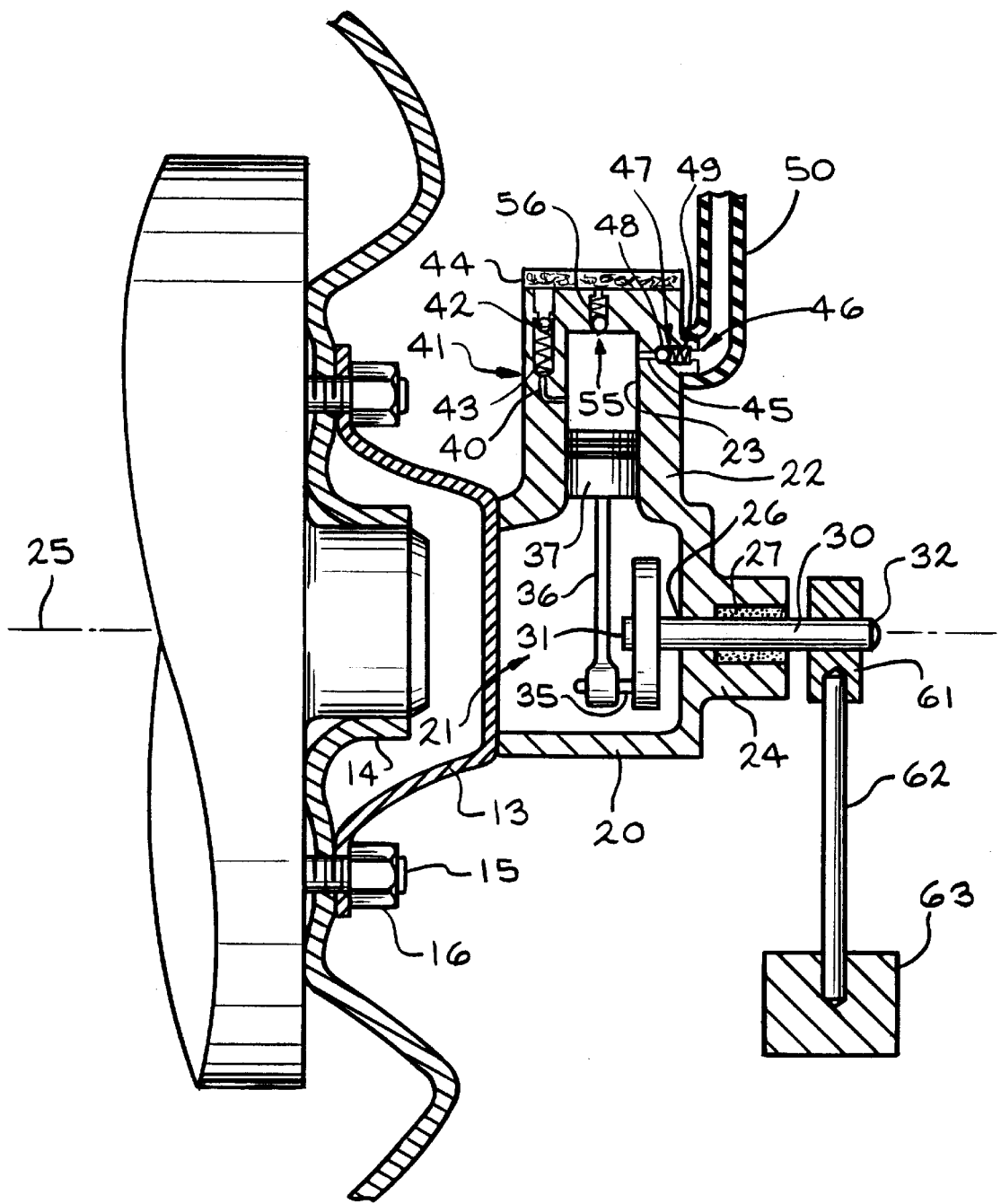
FIG. 2 is a sectional view of the tire pump shown in FIG. 1 taken along line 2—2.

Referring now to the drawings, there is illustrated, in FIGS. 1 and 2, a pendulum driven reciprocating piston tire pump mechanism, indicated generally at 10, in accordance with this invention. The tire pump mechanism 10 includes a compressor housing 11 and a pendulum assembly 12.

The compressor housing 11 is attached to a bracket 13 which is secured to a vehicle wheel 14. For simplicity, the vehicle wheel 14 is shown in phantom in FIG. 1. Additionally, for illustrative purposes, the bracket 13 has been rotated by 90 degrees in FIG. 2. In the preferred embodiment, two apertures are formed though the extended arms of the bracket 13. The apertures receive the wheel mounting lugs 15 and the bracket 13 is secured to the wheel 14 with the wheel mounting nuts 16. Thus, the tire pump mechanism 10 can be mounted upon a conventional vehicle wheel 14 without any modification of the wheel 14.

While a bracket 13 having two arms is illustrated in FIG. 1, it will be appreciated that a more complex structure can be utilized as a bracket. For example, the bracket can include three extending arms (not shown) for attachment of the tire pump mechanism 10 to three wheel mounting lugs. As will be explained below, the bracket structure is designed to maintain a specific spatial orientation of the housing 11 relative to the wheel 14.

The compressor housing 11 includes a hollow base 20 which defines a internal chamber 21. The base 20 is attached to the bracket 13 by a plurality of conventional fasteners (not shown). Alternately, the housing base 20 can be welded to the bracket 13 or the bracket can be formed integrally with the housing 11 (not shown). The housing 11 also includes a hollow cylinder 22 which extends radially from the housing base 20 and defines a cylinder bore 23. The structure of the bracket 13 is designed to position the housing 11 upon the wheel 14 with the cylinder 22 extending in a radial direction from the center of the wheel 14.

A boss 24 is formed upon the housing 11 which extends axially from the housing base 20. The boss 24 is concentric with an axis 25 of the wheel 14. A bore 26, which also is concentric with the wheel axis 25 extends through the boss 24. A porous bearing sleeve 27, which is saturated with a lubricant, is disposed within the bore 26 in the boss 24. While a bearing sleeve 27 is illustrated in FIG. 2, it will be appreciated that other types of bearings can be used, such as, for example, ball bearings mounted in appropriate bearing races.

The bearing sleeve 27 receives and supports a rotatable drive shaft 30 which extends through the boss bore 26. The drive shaft 30 has an inner end 31, which extends into the housing base chamber 21, and an outer end 32, which extends axially from the housing 11. A circular drive wheel 33 is mounted upon the inner end 31 of the drive shaft 30. The drive wheel 33 carries a connecting pin 35 which is mounted eccentrically thereon. A connecting rod 36 couples the connecting pin 35 to a compressor piston 37. As shown in FIG. 2, the piston 37 is disposed within the cylinder bore 23. As will be described below, the eccentric mounting of the connecting pin 35 upon the drive wheel converts rotary motion of the drive wheel 33 into a reciprocation motion.

An intake passageway 40 formed in the cylinder 21 communicates between the ambient air external to the tire pump mechanism 10 and the lower portion of the cylinder bore 23. An intake check valve 41 is mounted in the intake passage way 40. The intake check valve 41 includes a valve ball 42 and a return spring 43 and is operative to open during a downstroke of the piston 37. Alternately, a flapper valve (not shown) or other air regulating device may be substituted for the intake check valve 41. The intake check valve 41 closes when an upstroke of the piston 37 commences. An air filter 44 is mounted at the inlet of the intake passageway 41.

An exhaust passageway 45 is also formed in the cylinder 22 and communicates between the upper portion of the cylinder bore 23 and an exhaust port 46. An exhaust check valve 47 is mounted in the outlet passageway 45. The exhaust check valve 47 includes a valve ball 48 and a return spring 49 and is operative to open when the piston 37 is traveling in a radial direction away from the axis 25. In the following description, such piston travel will be referred to as an "upstroke". The spring constant of the valve spring 49 is selected to allow the exhaust check valve 47 to open when the air pressure in the cylinder bore 23 exceeds a predetermined amount. Conversely, when the piston 37 travels radially toward the axis 25, the exhaust valve 47 is closed to seal the outlet port 46. In the following description, such piston 37 travel will be referred to as an "downstroke". A flexible hose 50 connects the exhaust port 46 to the valve stem (not shown) of a pneumatic tire (not shown) mounted upon the wheel 14.

The cylinder 22 further has a pressure relief passageway 55 formed therein which communicates between the upper portion of the cylinder bore 23 and the ambient air external to the tire pump mechanism 10. A pressure relief check valve 56 is mounted in the pressure relief passageway 55 and is operative to open when the pressure in the cylinder bore 23 exceeds a predetermined amount to assure that the tire is not over-inflated. In the preferred embodiment, the pressure relief valve 56 opens at a pressure which is slightly greater than the rated tire inflation pressure.

The pendulum assembly 12 is mounted upon the outer end 32 of the drive shaft 30. The pendulum assembly 12 includes a weight 60 suspended from an annular collar 61 by a shaft 62. The collar 61 receives the outer end 32 of the drive shaft 30 and is secured thereto. In the preferred embodiment, the tire pump mechanism 10 is enclosed in a hollow protective housing (not shown) which is attached to the vehicle wheel 14; however, such a housing is optional.

The operation of the tire pump mechanism 10 will now be described. As the wheel 14 rotates, the tire pump mechanism 10 also rotates. The pendulum weight 60 is selected to be sufficiently heavy to remain relatively stationary as the pump mechanism 10 rotates with the wheel 14. Accordingly, the pendulum assembly 12 causes the drive shaft 30 and drive wheel 33 to rotate relative to the pump housing 11. The eccentrically mounted connecting pin 35 cooperates with the connecting rod 36 to convert the rotary motion of the drive wheel 33 into a reciprocal motion which reciprocates the compressor piston 37 within the cylinder bore 23.

As the piston 37 moves in a downward direction in FIG. 2, or downstroke, the intake check valve 41 opens, allowing the piston to draw air through the intake passageway 40 and into the cylinder bore 23. Upon starting to move in an upward direction in FIG. 2, or upstroke, the piston 37 begins to compress the air in the cylinder bore 23, causing the intake check valve 41 to close. As the piston 37 continues in an upward direction, it covers the intake port and thereby seals the intake passageway 40. As the air in the cylinder bore 23 is further compressed, the exhaust check valve 47 opens, allowing the compressed air to flow through the hose 50 to the air chamber of the associated pneumatic tire. If the air pressure in the cylinder bore 23 exceeds the rated tire inflation pressure, the pressure relief valve 56 opens to vent the excess pressure to atmosphere.

One advantage of the pendulum driven reciprocating piston tire pump mechanism 10 illustrated in FIGS. 1 and 2 is that the piston 16 moves in a radial direction relative to the motion of the wheel. Also, the piston 16 is driven by an eccentric member rather than being driven by a cam. In addition, the pendulum driven reciprocating piston tire pump mechanism 10 is not "side specific", i.e., can be used on both the right or left sides of the vehicle. As a result, the tire pump mechanism 10 cannot be mistakenly installed on the wrong side of the vehicle. Furthermore, the pendulum driven reciprocating piston tire pump mechanism 10 effectively operates in both directions, i.e., the pump mechanism 10 operates when the vehicle travels in either a forward or a reverse direction.

The present invention contemplates an alternate embodiment of the tire pump (not shown) which does not include an intake check valve. Instead, the sealing action of the piston 37 over the intake passageway port is sufficient to close the cylinder bore 23 for compression of the gas contained therein.

Figure 3:
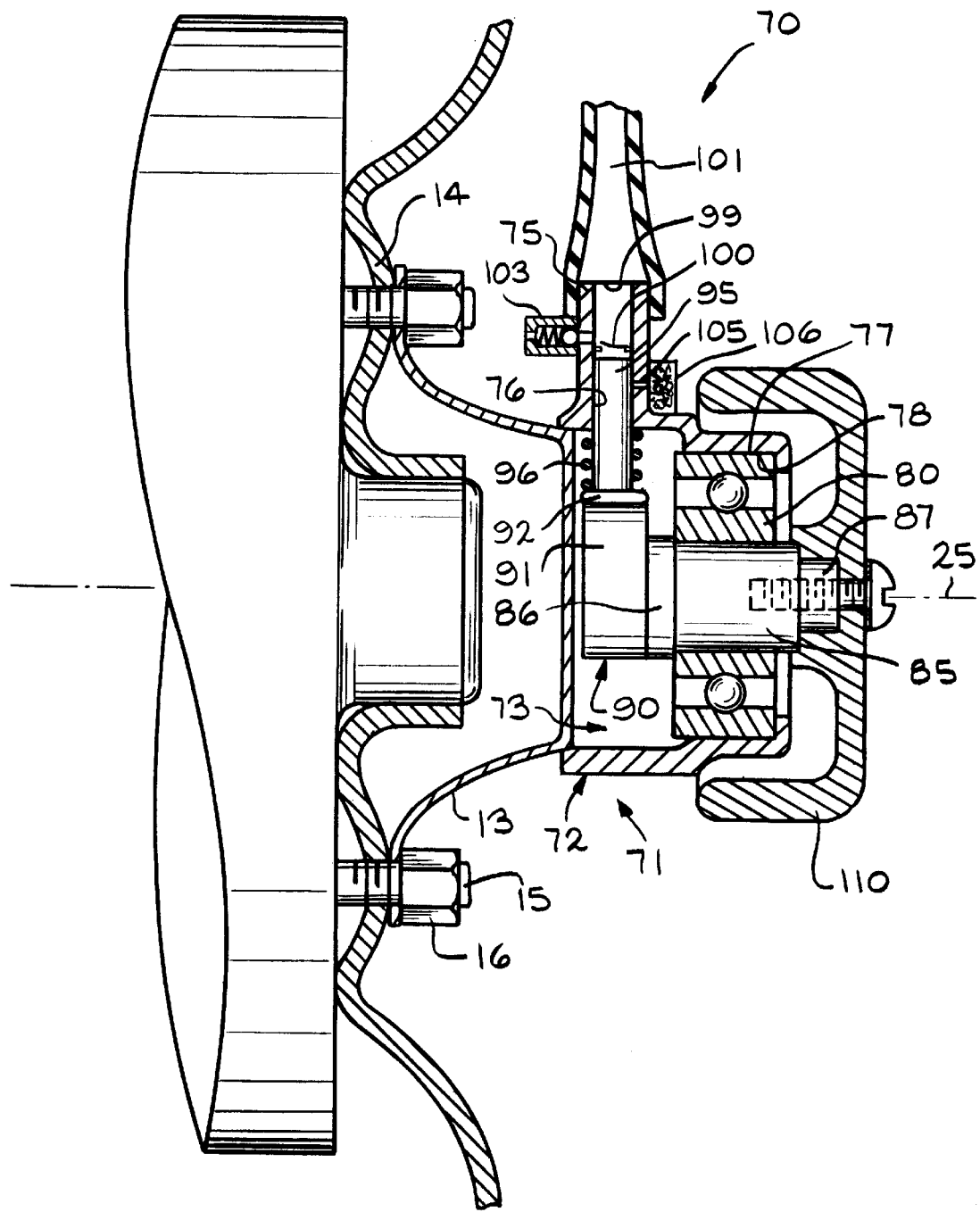
FIG. 3 is a sectional view of an alternate embodiment of the tire pump shown in FIG. 1.

Referring now to FIG. 3, there is illustrated another alternate embodiment of the invention which includes a flywheel driven reciprocating piston tire pump mechanism, indicated generally at 70. Components shown in FIG. 3 which are similar to components shown in FIGS. 1 and 2 are identified by the same numerical designators. As in FIG. 2, the bracket 13 shown in FIG. 3 is rotated 90 degrees for illustrative purposes.

The tire pump mechanism 70 includes a housing 71. Similar to the tire pump mechanism 10 described above, the housing 71 is secured to the vehicle wheel 14 for rotation therewith by the bracket 13. Alternatively, the compressor housing 71 and the bracket 13 can be formed integral with one another.

The housing 71 includes a hollow housing base 72 which defines an internal chamber 73. The housing 71 also includes a hollow cylinder 75 which extends radially from the housing base 72 and defines a cylinder bore 76. An annular collar 77 is formed upon the housing 71 which extends axially from the housing base 72. The collar 77 is concentric with the axis 25 of the wheel 14. A bore 78, which also is concentric with the wheel axis 25 extends through the collar 77. A bearing 80 is disposed within the collar bore 78. While the bearing 80 is illustrated in FIG. 3 as including ball bearings carried in a pair of bearing races, it will be appreciated that other bearing devices can be used, such as, for example, a porous bearing sleeve (not shown) which is saturated with a lubricant.

The bearing 80 receives and supports a rotatable drive shaft 85 which extends through the collar bore 78. The drive shaft 85 has an inner end 86, which extends into the chamber 73 formed by the housing base 72, and an outer end 87, which extends axially from the housing 71. A drive cam 90, which has an eccentric lobe or projection 91, is mounted upon the inner end 86 of the drive shaft 85. The drive cam 90 is connected to the drive shaft 85 with a conventional coupling, such as a splined connection, such that the drive cam 90 rotates with the drive shaft 85.

The drive cam lobe 91 engages a flange 92 formed upon the lower end of a compressor piston 95. The compressor piston 95 is received within the cylinder bore 76. A spring 96 extends between an inner surface of the housing 71 and the piston flange 92 and is operative to urge the flange 92 against the cam lobe 91.

As shown in FIG. 3, the upper end of the cylinder bore 76 is open to form an exhaust port 99. A flapper valve 100 is disposed within the cylinder bore 76 above the piston 95. The flapper valve 100 is operative to close when the piston 95 is in a downstroke and to open when the piston 95 is in an upstroke. A flexible hose 101 connects the exhaust port 99 to the valve stem of an associated pneumatic tire. While a flapper valve 100 is illustrated in FIG. 3, it will be appreciated that the invention also can be practiced utilizing an exhaust passageway and exhaust check valve, as was described above.

A pressure relief valve 103 is mounted upon the upper portion of the cylinder 75 and communicates between the cylinder bore 76 and the ambient atmosphere. The pressure relief valve 103 is selected to open when the air pressure within the cylinder bore 76 exceeds a predetermined value, which, in the preferred embodiment, is slightly greater than the rated inflation pressure of the associated pneumatic tire.

An intake port 105 is formed through the side of the cylinder 75. The intake port is sealed as the piston 95 travels upward in the cylinder bore 76. An air filter 106 is mounted over the exterior opening of the intake port 105. Alternately, an intake passageway and intake check valve, as was described above, can be used to supply air to the cylinder bore 76.

The tire pump mechanism 70 is driven by an annular flywheel 110 which is attached to the outer end 87 of the drive shaft 85. The flywheel 110 is connected to the drive shaft 85 with a conventional coupling, such as a splined connection, such that the drive shaft 85 rotates with the flywheel 110 relative to the housing 71.

The operation of the flywheel driven tire pump mechanism 70 will now be described. As the associated vehicle accelerates or decelerates in either a forward or reverse direction, the wheel 14 and the compressor housing 71 rotate in the same direction and at the same rotational speed. At the same time, the mass of the flywheel 110 will cause the flywheel 110 to rotate in an opposite direction and at a different rotational speed than that of the wheel 14 and the compressor housing 71. As a result, the flywheel 110 rotates the drive shaft 85 relative to the housing 71. Accordingly, the drive cam 90 mounted upon the inner end 86 of the drive shaft 85 also rotates relative to the housing 71. The cam eccentric lobe 91 is operative to reciprocate the piston 95 within the cylinder bore 76.

As the piston 95 travels in a downward direction in FIG. 3, or downstroke, air is drawn through the intake port 105 and into the cylinder bore 76. As the piston 95 reverses and travels in an upward direction in FIG. 3, or upstroke, the intake port 105 is sealed and the air in the cylinder bore 95 compressed. When the air pressure exceeds the pressure in the associated tire air chamber, the flapper valve 100 opens to allow the compressed air to flow into the tire air chamber. If the rated inflation pressure of the tire is exceeded, the relief valve 103 opens to vent the excessive air pressure to the atmosphere.

One advantage of the flywheel tire pump mechanism 70 illustrated in FIG. 3 is that the mechanism 70 is effective to drive the piston 95 whenever the vehicle is accelerating or decelerating. As a result, a constant air pressure is maintained in the associated tire air chamber whenever the vehicle is in motion. Also, the flywheel driven tire pump mechanism 70 is not "side specific", i.e., it can be used on both the right or left sides of the vehicle. As a result, the tire pump mechanism 70 cannot be mistakenly installed on the wrong side of the vehicle. In addition, the flywheel driven tire pump mechanism 70 effectively operates in both directions, i.e., operates if the vehicle is traveling in a forward or reverse direction.

Both tire pump mechanisms 10 and 70 are operative to maintain the rated tire inflation pressure in a vehicle's tires. Accordingly, the present invention provides a number of benefits to the owner of a vehicle, whether it is an automobile, truck or motorcycle. The maintenance of the correct inflation pressure will result in longer tire service life. If all of the vehicle wheels are equipped with tire pumps, an even and balanced inflation of the tires will be maintained to allow for easy and safe handling of the vehicle. Incorrect tracking of the vehicle due to uneven tire pressure will be eliminated. Tire wear will be relatively constant and balanced to all the vehicle tires over their useful life. Additionally, maintenance of the correct inflation pressure will improve fuel consumption and provide a savings to the vehicle owner.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the tire pump mechanisms 10 and 70 have been illustrated and described in connection with a reciprocating piston type pump, other types of pumps can be used. For example, a screw type pump (not shown), a centrifugal force type pump (not shown), or a rotary vane gear type pump (not shown) can be used. Additionally, it will be appreciated that the pendulum assembly 12 illustrated in FIG. 2 can be utilized with the drive cam 90 shown in FIG. 3 to reciprocate the piston 37. Similarly, the flywheel 110 illustrated in FIG. 3 can be substituted to rotate the drive shaft 30 and drive wheel 33 in FIG. 2.

What is claimed is:

1. A pump mechanism for maintaining inflation air within a pneumatic tire mounted upon a vehicle wheel, the pump mechanism comprising:

a bracket which is adapted for mounting upon a vehicle wheel;

a housing mounted upon said bracket, said housing including a base portion which defines a chamber and a cylinder portion which defines a cylinder bore, said cylinder bore communicating with said base portion chamber, said chamber being defined by said bracket and said housing with said housing providing sole support for said drive shaft;

a reciprocating piston received within said cylinder bore;

a rotatable drive shaft having first and second ends, said first end mounted in said housing base portion and extending into said base portion chamber;

a coupling mechanism connecting said drive shaft to said piston, said coupling mechanism operable to convert a rotary motion of said drive shaft into a reciprocating motion of said piston; and a drive mechanism attached to said second end of said drive shaft, said drive mechanism operable to rotate said drive shaft whereby said piston is reciprocated to compress a fluid contained in said cylinder bore.

2. A pump mechanism according to claim 1 wherein said housing is mounted upon a bracket, said bracket being adapted to be attached to a vehicle wheel such that said cylinder bore extends in a radial direction relative to the center of the wheel.

3. A pump mechanism according to claim 1 wherein said coupling mechanism includes a drive wheel mounted upon an end of said drive shaft, said drive wheel carrying an eccentrically mounted connecting pin, said connecting pin coupled to a first end of a connecting rod, said connecting rod having a second end connected to said piston, said eccentrically mounted connecting pin operative to convert rotation of said drive wheel into a reciprocating motion.

4. A pump mechanism according to claim 3 wherein said drive mechanism includes a pendulum assembly mounted upon said drive shaft, said pendulum mechanism including a pendulum weight having sufficient weight to remain relatively stationary as the vehicle wheel rotates where by the drive shaft is rotated relative to said housing.

5. A pump mechanism according to claim 3 wherein said drive mechanism includes a flywheel mounted upon said drive shaft, said flywheel having sufficient weight to cause rotation of said drive shaft relative to said housing when the vehicle accelerates and decelerates.

6. A pump mechanism according to claim 4 wherein said cylinder housing has an exhaust passageway communicating between said cylinder bore and an exhaust port, said exhaust port being adapted to be connected to an air chamber of a pneumatic tire mounted upon the vehicle wheel, and further wherein an air regulating device is mounted in said exhaust passageway to control the flow of air therethrough.

7. A pump mechanism according to claim 6 wherein said air regulating device is a check valve which is operable to allow air flow from said cylinder bore to said air chamber of said tire.

8. A pump mechanism according to claim 7 wherein said cylinder housing has pressure relief passageway communicating between said cylinder bore and a pressure relief port, and further wherein a normally closed pressure relief valve is mounted within said pressure relief passage way, said pressure relief valve being operable to open upon the pressure with said cylinder bore reaching a predetermined value.

9. A pump mechanism for maintaining inflation air within a pneumatic tire mounted upon a vehicle wheel, the pump mechanism comprising:

a bracket which is adapted for mounting upon a vehicle wheel;

a housing mounted upon said bracket, said housing including a base portion which defines a chamber and a cylinder portion which defines a cylinder bore, said cylinder bore communicating with said base portion chamber, said chamber being defined by said bracket and said housing with said housing providing sole support for said drive shaft;

a reciprocating piston received within said cylinder bore;

a rotatable drive shaft having first and second ends mounted in said housing base portion and extending into said base portion chamber;

a cam mounted upon said first end of said drive shaft, said cam including an eccentric lobe, said lobe extending in a radial direction from said drive shaft and into direct sliding contact with an end of said piston, said cam operative to convert rotation of said drive shaft into a reciprocating motion of said piston; and a drive mechanism attached to said second end of said drive shaft, said drive mechanism operable to rotate said drive shaft whereby said piston is reciprocated to compress a fluid contained in said cylinder bore.

10. A pump mechanism according to claim 9 further including a spring mounted within said housing which urges said end of said piston against said cam lobe.

11. A pump mechanism according to claim 10 wherein said drive mechanism includes a pendulum assembly mounted upon said drive shaft, said pendulum mechanism including a pendulum weight having sufficient weight to remain relatively stationary as the vehicle wheel rotates whereby the drive shaft is rotated relative to said housing.

12. A pump mechanism according to claim 10 wherein said drive mechanism includes a flywheel mounted upon said drive shaft, said flywheel having sufficient weight to cause rotation of said drive shaft relative to said housing when the vehicle accelerates and decelerates.

13. A pump mechanism according to claim 12 wherein said cylinder housing has an exhaust passageway communicating between said cylinder bore and an exhaust port, said exhaust port being adapted to be connected to an air chamber of a pneumatic tire mounted upon the vehicle wheel, and further wherein an air regulating device is mounted in said exhaust passageway to control the flow of air therethrough.

14. A pump mechanism according to claim 13 wherein said air regulating device is a check valve which is operable to allow air flow from said cylinder bore to said air chamber of said tire.

15. A pump mechanism according to claim 14 wherein said cylinder housing has a pressure relief passageway communicating between said cylinder bore and a pressure relief port, and further wherein a normally closed pressure relief valve is mounted within said pressure relief passageway, said pressure relief valve being operable to open upon the pressure with said cylinder bore reaching a predetermined value.

* * * * *